United States Patent
Stengel et al.

(10) Patent No.: US 9,511,868 B2
(45) Date of Patent: Dec. 6, 2016

(54) MIXING DEVICE FOR AN AIRCRAFT AIR CONDITIONING SYSTEM

(71) Applicant: AIRBUS OPERATIONS GMBH, Hamburg (DE)

(72) Inventors: Torsten Stengel, Buxtehude (DE); Jens Elmers, Hamburg (DE); Michael Markwart, Halstenbek (DE); Thomas Scherer, Hamburg (DE); Jens Lohmar, Hamburg (DE); Dariusz Krakowski, Buxtehude (DE); Martin Schmid, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 132 days.

(21) Appl. No.: 13/645,943

(22) Filed: Oct. 5, 2012

(65) Prior Publication Data
US 2013/0130607 A1    May 23, 2013

Related U.S. Application Data

(63) Continuation of application No. PCT/EP2011/001769, filed on Apr. 8, 2011.
(Continued)

(30) Foreign Application Priority Data

Apr. 9, 2010 (DE) .................. 10 2010 014 354
Apr. 9, 2010 (DE) .................. 10 2010 014 355

(51) Int. Cl.
  *B64D 13/00* (2006.01)
  *B64D 13/06* (2006.01)
(52) U.S. Cl.
  CPC ....... *B64D 13/00* (2013.01); *B64D 2013/0688* (2013.01)

(58) Field of Classification Search
  CPC .............. B64D 13/00; B64D 2013/064; B64D 2013/0688; B64D 13/06; F24F 13/04; F24F 13/06; F24F 13/22; F24F 13/26; F24F 3/1603
  (Continued)

(56) References Cited

U.S. PATENT DOCUMENTS 2,488,218 A * 11/1949 McCollum ................ 126/116 R
4,285,466 A *  8/1981 Linscheid et al. ............. 236/13
(Continued)

FOREIGN PATENT DOCUMENTS

DE      44 25 871       2/1996
DE    102006014572   *  8/2008 ............. B64D 13/06
(Continued)

OTHER PUBLICATIONS

International Search Report dated Oct. 11, 2011.

*Primary Examiner* — Gregory Huson
*Assistant Examiner* — Dana Tighe
(74) *Attorney, Agent, or Firm* — Dickinson Wirght PLLC

(57) ABSTRACT

A mixing device for an aircraft air conditioning system includes a plurality of cold-air supply lines, which are devised to supply cold air to the mixing device. A plurality of warm-air supply lines is further provided, which are devised to supply warm air to the mixing device. A first premixing chamber is connected to the cold-air supply lines and devised to mix the cold air that is fed through the cold-air supply lines into the first premixing chamber. A second premixing chamber is connected to the warm-air supply lines and devised to mix the warm air that is fed through the warm-air supply lines into the second premixing chamber. Finally, a main mixing chamber is connected to the first and the second premixing chambers and devised to mix (Continued)

the cold air premixed in the first premixing chamber with the warm air premixed in the second premixing chamber.

11 Claims, 1 Drawing Sheet

Related U.S. Application Data

(60) Provisional application No. 61/322,571, filed on Apr. 9, 2010, provisional application No. 61/322,564, filed on Apr. 9, 2010.

(58) Field of Classification Search
USPC .................. 454/71, 76, 75, 160, 261, 72
See application file for complete search history.

(56) References Cited

U.S. PATENT DOCUMENTS

| | | | | |
|---|---|---|---|---|
| 4,517,813 A | * | 5/1985 | Eggebrecht et al. | 62/284 |
| 4,769,051 A | * | 9/1988 | Defrancesco | 96/128 |
| 4,942,739 A | * | 7/1990 | Uda et al. | 62/93 |
| 5,516,330 A | * | 5/1996 | Dechow et al. | 454/74 |
| 5,545,084 A | * | 8/1996 | Fischer et al. | 454/76 |
| 5,634,964 A | * | 6/1997 | Army et al. | 95/269 |
| 5,695,396 A | * | 12/1997 | Markwart | B64D 13/00 454/71 |
| 6,012,515 A | * | 1/2000 | Stubbendorff et al. | 165/257 |
| 6,159,091 A | * | 12/2000 | Horstman et al. | 454/76 |
| 6,389,826 B2 | * | 5/2002 | Buchholz | 165/205 |
| 6,401,473 B1 | * | 6/2002 | Ng et al. | 62/239 |
| 6,449,963 B1 | * | 9/2002 | Ng et al. | 62/86 |
| 6,921,047 B2 | * | 7/2005 | McColgan et al. | 244/118.5 |
| 6,942,183 B2 | * | 9/2005 | Zywiak | 244/118.5 |
| 6,948,331 B1 | * | 9/2005 | Ho | 62/401 |
| 6,971,607 B2 | * | 12/2005 | McColgan et al. | 244/118.5 |
| 8,292,222 B2 | * | 10/2012 | Solntsev et al. | 244/118.5 |
| 8,303,384 B2 | * | 11/2012 | Krakowski et al. | 454/76 |
| 8,430,730 B2 | * | 4/2013 | Feisthammel et al. | 454/76 |
| 8,789,766 B2 | * | 7/2014 | Baldauf | 237/12.3 A |
| 2004/0231350 A1 | | 11/2004 | Kline | |
| 2009/0071556 A1 | | 3/2009 | Bourlart | |
| 2009/0073799 A1 | | 3/2009 | Bourlart | |
| 2009/0163131 A1 | * | 6/2009 | Walkinshaw et al. | 454/76 |
| 2010/0173576 A1 | * | 7/2010 | Schmid et al. | 454/75 |
| 2010/0273410 A1 | * | 10/2010 | Gumm | B64D 13/06 454/76 |
| 2012/0273051 A1 | * | 11/2012 | Kelnhofer et al. | 137/2 |

FOREIGN PATENT DOCUMENTS

| | | |
|---|---|---|
| EP | 1 254 699 | 1/2002 |
| WO | 2004/106158 | 12/2004 |

* cited by examiner

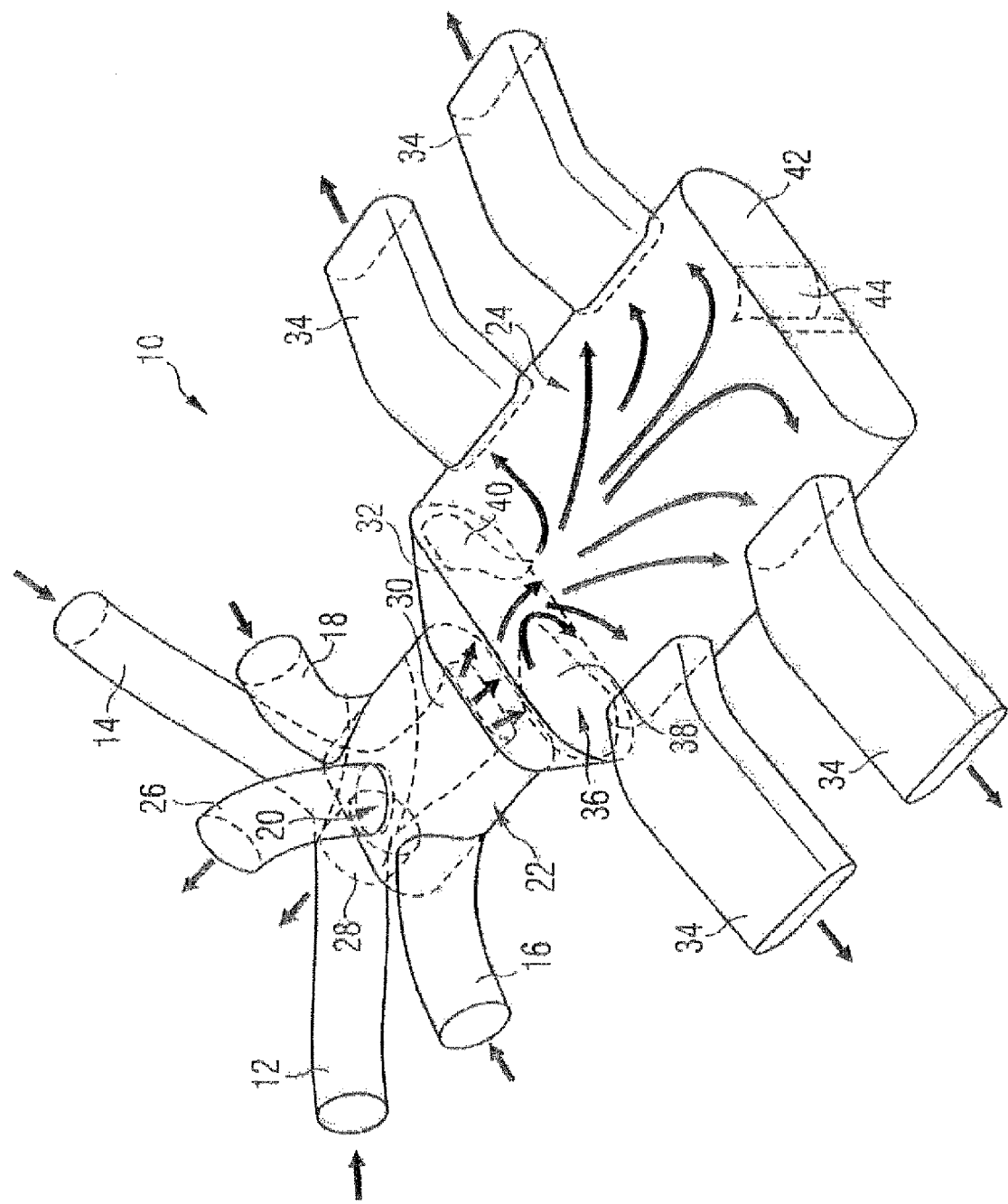

MIXING DEVICE FOR AN AIRCRAFT AIR CONDITIONING SYSTEM

CROSS REFERENCE TO RELATED APPLICATIONS

This application is entitled to and claims the benefit of German Application No. DE 10 2010 014 355.3, German Application No. DE 10 2010 014 354.5, U.S. Provisional Application No. 61/322,571, and U.S. Provisional Application No. 61/322,564, each filed Apr. 9, 2010, the disclosures of which, including the specification, drawings and abstract, are incorporated herein by reference in their entirety.

FIELD

The present invention relates to a mixing device for an aircraft air conditioning system as well as to an aircraft air conditioning system equipped with such a mixing device.

BACKGROUND

In a modern aircraft the passenger cabin or sub-regions of the passenger cabin, the cargo hold or sub-regions of the cargo hold and the cockpit form various air conditioning zones that are conventionally air-conditioned by means of an aircraft air conditioning system both during cruising and during taxiing of the aircraft. Hot bleed air under an elevated pressure is removed from the engine compressors or auxiliary engine compressors and supplied to the aircraft air conditioning system. In the air conditioning units, the so-called air conditioning packs of the aircraft air conditioning system, the bleed air is expanded and cooled down to a desired low temperature. Finally, the air conditioned in the air conditioning units is conveyed as cooled fresh air into a main fresh-air line of the air conditioning system. The fresh air flowing through the main fresh-air line is conveyed into a mixing device, where it is mixed with recirculation air that is extracted from the passenger cabin. The mixed air produced in the mixing device from cold fresh air provided by the air conditioning packs and recirculation air extracted from the passenger cabin is finally used to air-condition the various air conditioning zones of the aircraft.

Mixing devices currently used in aircraft air conditioning systems are connected by appropriate connections to a plurality of pipe systems, through which, depending on the operating state of the aircraft, air flows at different flow rates and at different temperatures. However, the arrangement, the geometry and the course of the connections and pipe systems may be optimized usually only for one operating state, i.e. one flow rate and one temperature. Installation space restrictions on board the aircraft moreover influence the geometry and the course of the connections and pipe systems. In dependence upon the flow rate and the temperature of the air supplied to the mixing device through the pipe systems temperature differences within the mixing devices and hence variations of the mixing quality may therefore arise, wherein in particular a fault scenario linked to failure of an air flow may considerably impair the mixing quality.

Insufficient mixing of the cold and warm air flows in the mixing device makes it difficult or even impossible to supply all of the air outlets of the mixing device with air at the desired same temperature and with the desired same fresh-air/recirculation-air ratio. This may result in comfort losses, but also in a non-uniform supply of fresh air to the persons situated on board the aircraft. Furthermore, in operating situations of the air conditioning system, in which the cold fresh air is supplied to the mixing device at a temperature <0° C., inadequate mixing of the cold fresh air supplied to the mixing device with warm recirculation air may lead, because of the moisture contained in the fresh air, to the attachment of ice and snow in the mixing device or in the pipe systems connected to the mixing devices.

In order to be able to guarantee a satisfactory mixing quality, mixing devices currently used in aircraft air conditioning systems need to have as great a mixing path length as possible, with the result that the mixing devices are relatively bulky. In the mixing devices pressure losses moreover occur, which have to be compensated by a corresponding high conveying capacity of conveying devices used to convey the air flows through the mixing devices.

The invention is geared to the object of indicating a mixing device for an aircraft air conditioning system that enables a uniform mixing of the warm and cold air flows that are supplied to the mixing device. The invention is further geared to the object of providing an aircraft air conditioning system equipped with such a mixing device.

This object is achieved by a mixing device for an aircraft air conditioning system having the features of attached claims and by an aircraft air conditioning system having the features of attached claims.

A mixing device suitable for use in an aircraft air conditioning system comprises a plurality of cold-air supply lines, which are adapted to supply cold air to the mixing device. The cold air to be supplied to the mixing device may be produced for example by an air conditioning unit or a plurality of air conditioning units of the air conditioning system. For example, two cold-air supply lines may be provided, which connect the mixing device to two air conditioning units of the aircraft air conditioning system that are constructed separately from one another. The mixing device according to the invention further comprises a plurality of warm-air supply lines, which are adapted to supply warm air to the mixing device. The warm-air supply lines are preferably recirculation-air lines, which connect the mixing device to a passenger cabin or a cargo hold of the aircraft and convey recirculation air from the passenger cabin or cargo hold into the mixing device. The mixing device according to the invention preferably comprises at least two warm-air supply lines, which connect the mixing device for example to various regions of the passenger cabin and/or of the cargo hold.

A first premixing chamber of the mixing device is connected to the cold-air supply lines and adapted to mix the cold air that is fed through the cold-air supply lines into the first admixing chamber. A second premixing chamber is further provided, which is connected to the warm-air supply lines and adapted to mix the warm air that is fed through the warm-air supply lines into the second premixing chamber. In the first premixing chamber, therefore, a premixing of the cold air fed through the cold-air supply lines to the mixing device occurs before the cold air comes into contact with the warm air fed through the warm-air supply lines. In a similar fashion, the second premixing chamber is used to premix the warm air fed through the warm-air supply lines to the mixing device before the warm air comes into contact with the cold air fed through the cold-air supply lines to the mixing device.

The mixing device according to the invention further comprises a main mixing chamber, which is connected to the first and the second premixing chamber and devised to mix the cold air premixed in the first premixing chamber with the warm air premixed in the second premixing chamber. The main mixing chamber of the mixing device according to the invention is preferably supplied with premixed air exclusively by means of the premixing chambers, i.e. a direct supply of non-premixed cold or warm air into the main mixing chamber is not provided. The mixing device according to the invention is preferably consequently as a whole of a two-stage construction, i.e. all of the air flows supplied to the mixing device are first treated in one of the premixing chambers before being supplied to the main mixing chamber.

The mixing device according to the invention is notable for the fact that independently of the operating situation of the aircraft air conditioning system, i.e. independently of variations of the flow rates and/or temperatures of the air flows supplied to the mixing device, a constant mixing quantity may be achieved. This applies even in a fault scenario linked to failure of an air flow, i.e. with the mixing device according to the invention even in the case of such a fault scenario it is still possible to realize a satisfactory mixing quality. A further advantage of the mixing device according to the invention is that by virtue of the uniform mixing of the cold air supplied to the mixing device with warm air it is possible to minimize an attachment of ice and snow in the mixing device or in the pipe systems connected to the mixing device that is caused by inadequate mixing of the air flows supplied to the mixing device.

The first premixing chamber of the mixing device according to the invention is preferably connected to a cold-air discharge line for discharging cold air from the first premixing chamber. Through the cold-air discharge line cold air that is not mixed with warm air may be removed from the mixing device and supplied for example as a fresh air supply to a cockpit of the aircraft. By virtue of the connection of the cold-air discharge line to the first premixing chamber it is guaranteed that even in the event of failure of the cold air supply through one of the cold-air supply lines connected to the first premixing chamber a discharge of cold air from the first premixing chamber and hence a supply of fresh air, for example to the cockpit of the aircraft, is possible.

Alternatively or additionally the second premixing chamber of the mixing device according to the invention may be connected to a warm-air discharge line for discharging warm air from the second premixing chamber. Warm air may be supplied through the warm-air discharge line to a system of the aircraft that requires warm air, for example to a de-icing system or the like. By virtue of the connection of the warm-air discharge line to the second premixing chamber it is ensured that, even in the event of failure of one of the warm air flows through one of the warm-air supply lines, enough warm air is available for discharge from the second premixing chamber through the warm-air discharge line.

In principle, the first premixing chamber and the second premixing chamber may be disposed in any desired manner relative to one another. For example, it is conceivable to dispose the second premixing chamber upstream of the first premixing chamber. In a preferred form of implementation of the mixing device according to the invention the first premixing chamber is however disposed upstream of the second premixing chamber. The first premixing chamber is preferably connected to the main mixing chamber via a nozzle that gives rise to an acceleration of the cold air flow conveyed from the first premixing chamber into the main mixing chamber. If the first premixing chamber is disposed upstream of the second premixing chamber, the nozzle connecting the first premixing chamber to the main mixing chamber preferably extends through the second premixing chamber. The nozzle preferably has at least in sections a flow cross section that widens in the direction of the cold air flow through the nozzle, i.e. is preferably at least in sections of a conical configuration.

The nozzle is preferably designed in such a way that at least in an inlet region of the nozzle facing the first premixing chamber a ratio between a generated surface of the nozzle and a through-flow volume of the nozzle increases in the direction of the cold air flow through the nozzle. An increase of the ratio between the generated surface and the through-flow volume of the nozzle and hence the air jet volume flowing through the nozzle enables an acceleration of the air jet flowing through the nozzle and hence the build-up of a velocity difference between the cold air flow, which is conveyed from the first premixing chamber into the main mixing chamber through the nozzle, and the warm air flow, which is not accelerated as it is fed from the second premixing chamber into the main mixing chamber. The cold air flow that is accelerated by means of the nozzle then acts as an injector, with the result that the pressure loss arising in the mixing device may be minimized. The injector effect of the nozzle moreover promotes mixing of the cold air exiting from the nozzle with the warm air flowing around the nozzle and therefore minimizes the required mixing path length. Consequently, the mixing device as a whole may be of a smaller design and therefore take up less installation space.

The nozzle is moreover preferably designed in such a way that in an outlet region, i.e. a region of the nozzle facing the main mixing chamber, the generated surface of the nozzle remains substantially constant in the direction of the cold air flow through the nozzle. Such a design of the nozzle prevents the occurrence of flow separation at divergent surfaces of the nozzle in the outlet region of the nozzle.

Finally, an outlet of the nozzle is preferably designed in such a way that a cold air flow exiting from the outlet of the nozzle forms a plurality of free jets. This optimizes the distribution of the cold air in the main mixing chamber and improves the mixing effect of the mixing device.

In an inlet region of the main mixing chamber facing the premixing chambers the main mixing chamber preferably comprises a diffuser. For example, the diffuser may lie downstream of, and adjacent to, the nozzle for supplying the cold air from the first premixing chamber into the main mixing chamber. Given such a configuration, the cold air from the nozzle is conveyed after exiting from the nozzle outlet into the diffuser, where an initial mixing with the warm air flowing around the nozzle may take place. Through the use of a diffuser in the main mixing chamber the mixing effect of the mixing device according to the invention may be further improved.

In the inlet region of the main mixing chamber facing the premixing chambers a flow control device may further be provided. For example, the flow control device may be disposed immediately downstream of the diffuser provided in the inlet region of the main mixing chamber. The flow control device is used preferably to guide the free jet that exits from the nozzle connecting the first premixing chamber to the main mixing chamber. In particular, the flow control device is used to correct unwanted deflections of the free jet that occur as a result of flow separation in the nozzle caused by extreme velocity differences between the cold air flow in the nozzle and the warm air flow surrounding the nozzle. Thus, by means of the flow control device an impairment of the mixing quality as a result of an unwanted deflection of the free jet exiting from the nozzle may be prevented.

The flow control device preferably comprises two flow baffle plates, which are curved in the direction of the cold air flow through the inlet region of the main mixing chamber and extend from mutually opposite side walls of the main mixing chamber into the cold air flow flowing through the inlet region of the main mixing chamber. The flow baffle plates of the flow control device are preferably configured in the form of triangular plates and disposed in such a way that in each case a point of the triangular plates extends from the mutually opposite side walls of the main mixing chamber into the cold air flow flowing through the inlet region of the main mixing chamber.

Finally, the mixing device according to the invention preferably comprises an anti-icing device. The anti-icing device may be disposed in the region of a rear wall of the main mixing chamber that lies opposite the inlet region of the main mixing chamber. By means of the anti-icing device ice may be prevented from depositing on the rear wall of the main mixing chamber lying opposite the inlet region of the main mixing chamber.

An aircraft air conditioning system according to the invention comprises a previously described mixing device.

BRIEF DESCRIPTION OF THE DRAWING

A preferred form of implementation of the invention is described in detail below with reference to the accompanying schematic FIG., which shows a three-dimensional representation of a mixing device that is suitable for use in an aircraft air conditioning system.

DETAILED DESCRIPTION OF EMBODIMENTS

A mixing device denoted in the FIG. by 10 comprises a first and a second cold air line 12, 14, which are devised in each case to supply cold air produced by an air conditioning unit to the mixing device 10. The mixing device 10 further comprises a first and a second warm air line 16, 18, which are devised in each case to supply warm recirculation air from a passenger cabin or a cargo hold of the aircraft to the mixing device 10.

The first and the second cold air line 12, 14 open out into a first premixing chamber 20. The first and the second warm air line 16, 18, on the other hand, open out into a second premixing chamber 22 disposed downstream of the first premixing chamber 20. In the first premixing chamber 20 the two cold air flows fed through the first and the second cold air line 12, 14 into the first premixing chamber 20 are mixed with one another. In a similar manner, in the second premixing chamber 22 the warm air flows fed through the first and the second warm air line 16, 18 into the second premixing chamber 22 are mixed with one another.

The mixing device 10 further comprises a main mixing chamber 24, which is connected to the first and the second premixing chamber 20, 22. In particular, the main mixing chamber 24 is disposed downstream of the premixing chambers 20, 22 and is used to mix the cold air premixed in the first premixing chamber 20 with the warm air premixed in the second premixing chamber 22.

The mixing device 10 is therefore of a two-stage construction. By virtue of supplying the main mixing chamber 24 with exclusively premixed air from the premixing chambers 20, 22 temperature differences that arise in the main mixing chamber 24 may be kept comparatively low. As a result, the mixing effect of the mixing device 10 may be held more or less constant even in the event of variations of the temperature and flow rate of the air flows fed through the cold air lines 12, 14 and the warm air lines 16, 18 into the mixing device 10. Even failure of an air flow does not lead to a drastic decline in the mixing quality achieved by the mixing device 10. Finally, the main mixing chamber 24 is well protected from icing caused by extreme temperature differences in the main mixing chamber.

Connected to the first premixing chamber 20 is a cold-air discharge line 26 for discharging cold air from the first premixing chamber 20. The cold-air discharge line 26 is used, where necessary, to supply fresh air to selected areas of the aircraft, for example to the cockpit. As the cold-air discharge line 26 is connected to the first premixing chamber 20, an adequate flow of cold air through the cold-air discharge line 26 is possible even in the event of failure of one of the cold air flows through the first or the second cold air line 12, 14.

In a similar manner, a warm-air discharge line 28 is connected to the second premixing chamber 22 for discharging warm air from the second premixing chamber 22. The warm-air discharge line 28 is used to supply warm air to a system on board the aircraft that requires warm air, for example to a de-icing system. By virtue of the connection of the warm-air discharge line 28 to the second premixing chamber 22 it is guaranteed that, even in the event of failure of one of the warm air flows through the first or the second warm air line 16, 18, sufficient warm air may be conveyed through the warm-air discharge line 28.

The first premixing chamber 20 disposed upstream of the second premixing chamber 22 is connected to the main mixing chamber 24 by a nozzle 30, which extends through the second premixing chamber 22. During operation of the mixing device 10 warm air from the second premixing chamber 22 consequently flows around the nozzle 30 for conveying cold air from the first premixing chamber 20 into the main mixing chamber 24. The nozzle 30 at least in sections is of a conical configuration, i.e. at least in sections has a flow cross section that widens in the direction of the cold air flow through the nozzle 30.

The nozzle 30 is designed in such a way that in an inlet region of the nozzle 30 a ratio between a lateral surface of the nozzle 30 and a through-flow volume of the nozzle 30 increases in the direction of the cold air flow through the nozzle 30. The cold air flow flowing through the nozzle 30 is therefore accelerated and produces a flow velocity difference relative to the warm air flow flowing from the second premixing chamber 22 into the main mixing chamber 24. In other words, with the aid of the nozzle 30 an injector effect is achieved, which promotes a mixing of the cold air exiting from the nozzle 30 with the warm air flowing around the nozzle 30 and hence minimizes the required mixing path length.

In an outlet region of the nozzle 30 facing the main mixing chamber 24 the lateral surface of the nozzle 30 however remains substantially constant in the direction of the cold air flow through the nozzle 30. Flow separations at divergent portions of the nozzle lateral surface may therefore be prevented. An outlet of the nozzle 30 is moreover designed in such a way that a cold air flow exiting from the outlet of the nozzle 30 forms a plurality of free jets. For example, the nozzle outlet, in order to form two free jets that exit from the nozzle outlet, may comprise a region, in which a spacing between mutually opposite portions of the nozzle lateral surface is reduced.

In an inlet region adjoining the second premixing chamber 22 and the outlet of the nozzle 30 the main mixing chamber 24 comprises a diffuser 32. The diffuser has a flow cross section that widens in the direction of the air flow through the diffuser 32 and is used to further improve the mixing effect of the mixing device 10. Downstream of the diffuser 32 the main mixing chamber 24 is connected to four mixed-air discharge lines 34 for discharging mixed air from the main mixing chamber 24.

In the inlet region of the main mixing chamber 24 a flow control device 36 is provided downstream of the diffuser 32 provided in the inlet region of the main mixing chamber 24. The flow control device 36 comprises two flow baffle plates 38, 40, which are curved in the direction of the cold air flow exiting from the nozzle 30 and flowing through the inlet region of the main mixing chamber 24 and extend from mutually opposite side walls of the main mixing chamber 24 into the cold air flow flowing through the inlet region of the main mixing chamber 24. The flow baffle plates 38, 40 are of a triangular configuration and disposed in such a way that a point of the triangle project into the cold air flow flowing through the inlet region of the main mixing chamber 24. With the aid of the flow control device 36 unwanted deflections of the cold-air free jets exiting from the nozzle 30 that are caused by flow separation in the nozzle 30 may be corrected and hence an impairment of the mixing quality in the main mixing chamber 24 that is related thereto may be prevented.

In the region of a rear wall 42 of the main mixing chamber 24 that lies opposite the inlet region of the main mixing chamber 24 an anti-icing device 44 configured in the form of an ice crusher is provided. The anti-icing device 44 prevents ice from depositing on the rear wall 42 of the main mixing chamber 24.

The invention claimed is:

1. A mixing device for an aircraft air conditioning system, comprising:
    a plurality of cold-air supply lines configured to supply cold air to the mixing device,
    a plurality of warm-air supply lines configured to supply warm air to the mixing device,
    a first premixing chamber, which is connected to the cold-air supply lines and configured to mix the cold air that is fed through the cold-air supply lines into the first premixing chamber,
    a second premixing chamber, which is connected to each of the warm-air supply lines and configured to mix the warm air that is fed through the warm-air supply lines into the second premixing chamber, and
    a main mixing chamber, which is connected to the first and the second premixing chamber and configured to mix the cold air premixed in the first premixing chamber with the warm air premixed in the second premixing chamber.

2. The mixing device according to claim 1, characterized in that the first premixing chamber is connected to a cold-air discharge line for discharging cold air from the first premixing chamber and/or that the second premixing chamber is connected to a warm-air discharge line for discharging warm air from the second premixing chamber.

3. The mixing device according to claim 1, characterized in that the first premixing chamber is disposed upstream of the second premixing chamber and the first premixing chamber is connected to the main mixing chamber via a nozzle, wherein the nozzle in particular has a flow cross section that widens in the direction of the cold air flow through the nozzle.

4. The mixing device according to claim 3, characterized in that the nozzle is configured such that at least in an inlet region of the nozzle a ratio between a generated surface of the nozzle and a through-flow volume of the nozzle increases in the direction of the cold air flow through the nozzle.

5. The mixing device according to claim 3, characterized in that the nozzle is configured such that in an outlet region of the nozzle the generated surface of the nozzle remains substantially constant.

6. The mixing device according to claim 3, characterized in that an outlet of the nozzle is configured such that a cold air flow exiting from the outlet of the nozzle forms a plurality of free jets.

7. The mixing device according to claim 1, characterized in that the main mixing chamber comprises a diffuser, which is disposed in an inlet region of the main mixing chamber, and/or that the main mixing chamber is connected to at least one mixed-air discharge line for discharging mixed air from the main mixing chamber.

8. The mixing device according to claim 1, characterized in that in an inlet region of the main mixing chamber, in particular downstream of a diffuser disposed in the inlet region of the main mixing chamber, a flow control device is provided, wherein the flow control device in particular comprises two flow baffle plates, which are curved in the direction of the cold air flow through the inlet region of the main mixing chamber and extend from mutually opposite side walls of the main mixing chamber into the cold air flow flowing through the inlet region of the main mixing chamber.

9. The mixing device according to claim 1, characterized by an anti-icing device, which is disposed in a region of a rear wall of the main mixing chamber that lies opposite an inlet region of the main mixing chamber.

10. The mixing device according to claim 1, wherein the plurality of cold-air supply lines are configured to supply cold air originating from different sources to the mixing device, and the plurality of warm-air supply lines are configured to supply warm air originating from different sources to the mixing device.

11. An aircraft air conditioning system, comprising a mixing device according to claim 1.

* * * * *